United States Patent [19]

Sweetser

[11] Patent Number: 5,271,236
[45] Date of Patent: Dec. 21, 1993

[54] INTEGRAL AMBIENT AIR AND REFRIGERATION ENERGY SAVINGS SYSTEM

[75] Inventor: Robert W. Sweetser, Essex, Vt.

[73] Assignee: Air Enterprises, Inc., Essex, Vt.

[21] Appl. No.: 997,024

[22] Filed: Dec. 28, 1992

[51] Int. Cl.[5] .......................................... F25B 25/00
[52] U.S. Cl. ........................................ 62/155; 62/332
[58] Field of Search ..................... 236/49.3; 62/176.6, 62/332, 410, 127, 155

[56] References Cited

U.S. PATENT DOCUMENTS 3,100,383  8/1963  Foster et al. .................. 62/127 X
3,151,470 10/1964  Quick ............................ 62/155 X
4,023,947  5/1977  Ferry ............................. 62/332 X
4,147,038  4/1979  Hoebing et al. ............... 62/332 X Primary Examiner—William E. Wayner
Attorney, Agent, or Firm—Thomas N. Neiman

[57] ABSTRACT

The system is adapted for saving energy in an ambient air and conventional refrigeration system by independently controlling the compressor, evaporator fans and door heating unit in conjunction with the outdoor temperatures and the unit's internal temperature. The system also provides controls that provide for freeze up protection. The system can be adapted for use with walk in cooler units currently in operation to provide a system that can provide operational cost savings and increased efficiency for the operator.

3 Claims, 2 Drawing Sheets

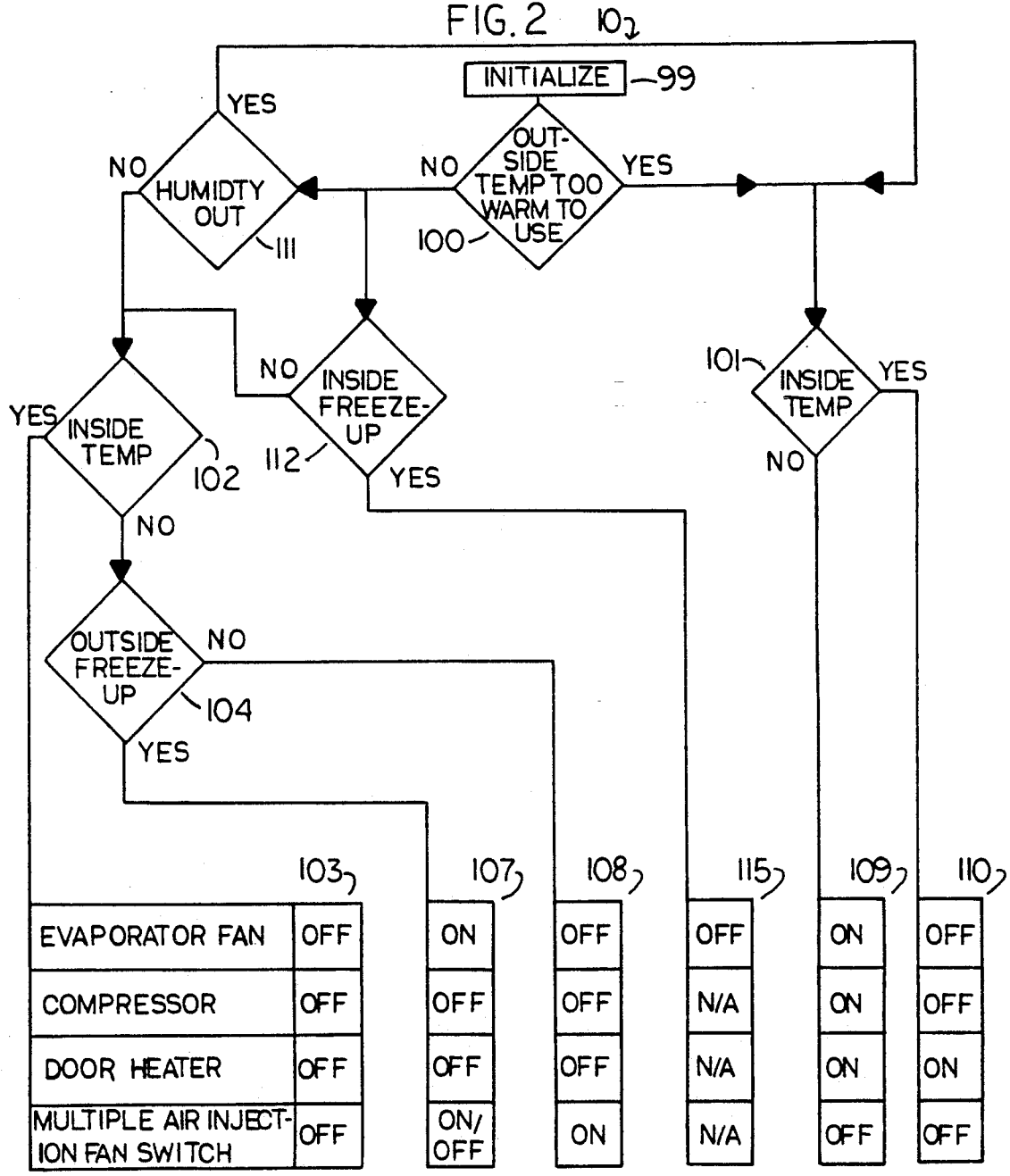

INTEGRAL AMBIENT AIR AND REFRIGERATION ENERGY SAVINGS SYSTEM

BACKGROUND OF THE INVENTION

This invention pertains to an ambient air cooling system of a refrigerated enclosure and, in particular to a system which separately controls the independent systems of the refrigerated enclosure, such as the compressor, evaporator fans, door heaters and the auxiliary outside air injection fans.

DESCRIPTION OF THE PRIOR ART

This invention relates to a cooling system utilizing ambient air as an added or auxiliary cooling medium. In the past, various different types and kinds of auxiliary cooling systems have been designed. Reference may be made to the following U.S. Pat. No. 1,053,443 issued to Scott in February 1913; U.S. Pat. No. 2,067,959 issued to Wasson in January 1937; and U.S. Pat. No. 2,299,174 issued to Plummer in October 1942. These patents show refrigerated enclosures that use cold ambient air to assist the refrigeration systems in order to save energy. Also shown is the U.S. Pat. No. 4,023,947 issued to Ferry that describes adjusting the amount of ambient air by controlling individual fans of a set of multiple fans. While this technique provides increased energy savings of these ambient air auxiliary cooling systems, it does not utilize other possible significant energy reductions.

Another conventional technique, exemplified in U.S. Pat. No. 4,244,193 issued to Haakenson in January 1981, provides even more energy savings, by controlling the mechanical refrigeration to an intermediate temperature level, which does not cool to the same low temperature as the ambient air handling units. Since there is an acceptable operating temperature for most refrigerated goods, this results in an increased savings of energy, however, it too, does not reduce other possible significant energy expenditures that can be obtained in these ambient air auxiliary cooling systems.

Further savings are achieved in the cost of these auxiliary cooling systems, exemplified by U.S. Pat. No. 4,147,038 issued to Hoebing et al., in April 1979, by saving in the deterioration of blower fans due to the condensation of moisture, caused by transferring the cold ambient air to the interior of the refrigerated enclosure, by mounting the blower fans into a small heated enclosure. Also, this invention further reduces the overall cost by eliminating local "freeze up" of products by employing diverters to guide cold air away from objects within the refrigerated enclosure in order to prevent them from being damaged by the cold air. While this invention helps eliminate overall costs, it does so with increased initial costs, i.e., added heat duct enclosures and increased complexity of the installation.

Clearly, it is desirable for a system that is simple to install and, at the same time be more effective. It is the object of this invention, then to set forth an improved integral ambient air and refrigerated energy savings system which avoids the disadvantages limitations, above-recited, which obtain in previous systems.

It is the object of this invention to teach an integral ambient air and refrigerated system capable of most of the potential energy savings with minimum increased initial costs and installation complexity. It is also an object of this invention to teach a system which employs an electrical control system to control the outside auxiliary multiple air injection fans; the mechanical refrigeration systems compressor; the mechanical refrigeration systems evaporator fans; and the enclosure access door heaters. In the preferred embodiment, the system employs turning on and off the compressor, evaporator fans, outside air injection fans and door heaters as required from outside and inside temperature conditions by controlling simple relay circuitry based upon the outside temperature, the enclosure temperature and the enclosure thermostat setting, and the enclosures freeze up set point.

BRIEF SUMMARY OF THE INVENTION

Particularly, it is the object of this invention to set forth an integral ambient air and refrigerated energy savings system, for use by operators using walk in refrigerated enclosures and the like comprising main mechanical refrigeration means; said main mechanical means having evaporator means; said main mechanical refrigeration means comprising at least one fan means; said main mechanical refrigeration means further comprising compressor means; said main mechanical refrigeration means further comprising thermostatic control means for controlling said main mechanical refrigeration means; ambient air cooling systems means; fan controller means for controlling each of the outside air injection independently; compressor control means for controlling said compressor means independently; freeze up protection means for providing first means for determining freeze up within said refrigerated enclosure, and second means for determining temperature extremes of the outside ambient air; system control means; said system control means comprising means for measuring outdoor temperature, enclosure temperature, and freeze up; said system control means further comprising means for operating said fan controller means; said system control means further comprising means for operating said compressor controller means; said system control means further comprising means for operating said door heater controller means; said system control means further comprising means for operating said ambient air cooling system means; humidity detection means; evaporated coil defrost means; and exhaust means.

BRIEF DESCRIPTION OF THE DRAWINGS

Further objects and features of this invention will become more apparent by reference to the following description taken in conjunction with the accompanying figure, in which:

FIG. 2 is a flow chart diagram of one embodiment of the operation of the ambient air auxiliary control system.

DESCRIPTION OF THE PREFERRED EMBODIMENT

Figure 1:
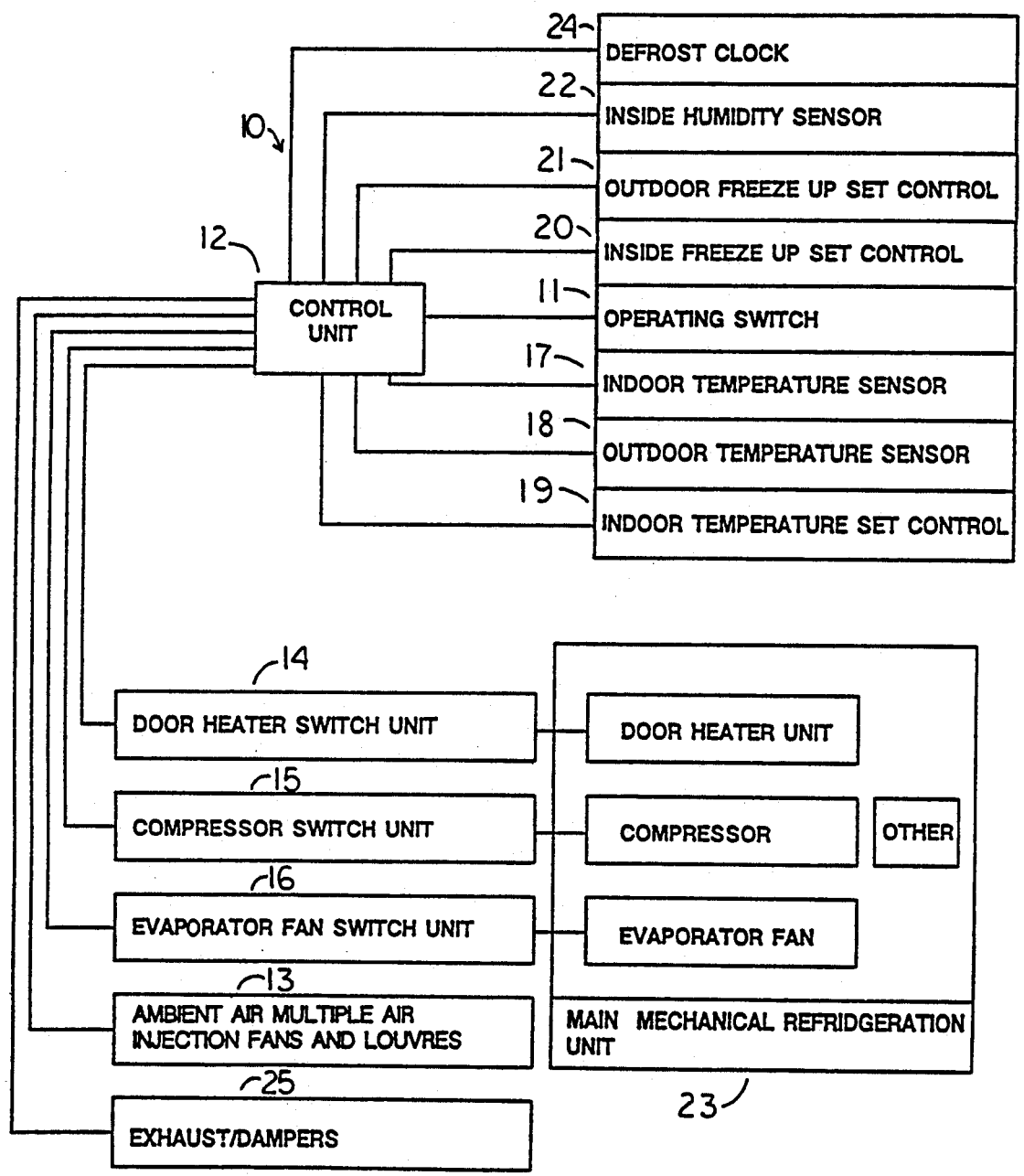
FIG. 1 is a block diagram of one embodiment of the ambient air auxiliary system.

The novel system 10, as shown if FIG. 1, is placed into operation when the operating switch 11 is put in the ON position. The control unit 12 supplies signals to the ambient air multiple air injection fan unit 13, the door heater switch 14, the compressor switch unit 15 and the evaporator fan switch unit 16 based upon the inputs received from the indoor temperature sensor 17, the outdoor temperature sensor 18, indoor temperature set control sensor 19 and the freeze up set control units 20 (inside freeze up), 21 (outside freeze up) and 22 (inside humidity sensor). When operating control switch 11 is in the OFF position, the control unit 12 supplies a signal to the compressor switch unit 15, the evaporator fan switch unit 16 and the door heater switch unit 14, allowing the main mechanical refrigeration unit 23 to work independently as it was originally designed. The ambient air multiple air injection fan unit 13 is shut off, except when the evaporator fan switch unit 16 is off when the indoor temperature sensor 17 determines the indoor temperature is satisfied. A defrost clock 24 and exhaust dampers 25 must also be added to the system 10.

As shown in FIG. 2, step 99 shows the control unit in its initial settings by the normal mechanical settings of the relays when the unit is off. When power is applied, step 100, which measures the outside and inside temperature, determines whether step 101 or step 111 or step 112 is applied. If step 101 (inside temperature satisfied) is applied, the result would indicate either step 109 or step 110 is implemented. If step 110 is applied, the outside air temperature is warmer than the inside air temperature and the inside air temperature is satisfied—therefore the evaporator fans are in their OFF state, the compressor is in its OFF state, the door heater is in its ON state and the multiple duct fan switch is in its OFF state. The door heaters ON being ON eliminates water condensation, since the outside air is warm and water condensation is likely to occur on the cold door surface. No other power is required to the refrigeration system.

If however, step 109 is implemented, the outside air is warmer than the inside air and the inside temperature does not meet the predefined setting. Therefore, the evaporator fans are in their ON state; the compressor is in its ON state; the door heater unit is in its ON state; and the multiple duct fan switch is in its OFF state. Here, the refrigeration unit is used to refrigerate, the outside air is too warm to assist in refrigeration, and the door heaters are in their ON state, eliminating condensation. This occurs because the outside air is warm and the doors are cold and, therefore condensation would be likely to occur without the door heaters.

If step 111 (humidity above the maximum or below the minimum) resulted in step 102 (inside room temperature) to be implemented, then step 102 would result which would result in step 103 or step 104 to occur. If step 104 (outside freeze up) is defined, step 107 is defined. If step 107 is chosen, the room humidity is below the maximum setting (Step 111), the outside air is colder than the inside air (step 100), the inside temperature is not meeting its predefined setting (step 102), and the freeze up thermostat is less than the setting and freeze up is likely to occur, therefore evaporator fans are in the ON state; the compressor is in its OFF state; the door heater unit is in its Off state; and the multiple air injection fan switch is in its ON/OFF state. In this case, the outside air is brought in to save energy, but the evaporator fans are left on only to move the inside air around to prevent freeze out. The number of multiple air injection air fans that are on is customized to the room size; the sensitivities of the edible products; and the multiple air injection fan input location. The door heater is OFF because condensation is not likely to occur. This has the added advantage of not requiring separately heated multiple duct fan units to eliminate condensation. If step 108 resulted, the outside air is colder than the inside air (step 100); the room humidity is not above the maximum setting; the inside temperature is not meeting its predefined setting; and the freeze up setting indicates that freeze up is not possible. This results in the evaporator fans are in their OFF state; the compressor is in its OFF state; the door heater unit is in its OFF state; and the multiple air injection fan switch is in its ON state which allows an energy savings by cooling solely by the outside air. Since condensation is not likely to occur, the door heaters are not needed.

If step 103 resulted rather than step 104, the outside air is colder than the inside air, the room humidity is not above the maximum setting, and the inside temperature is meeting its predefined setting. This will result in the evaporator fans being in their OFF state; the compressor is in its OFF state; the door heater is in the OFF state; and the multiple air injection fan switch is in its OFF state. Here, no energy is needed to maintain refrigeration, nor are the door heaters need since condensation is not likely to occur. If step 115 resulted, the outside air temperature is warmer than inside temperature (step 100), and the inside room temperature is less than the inside freeze up thermostat setting. In this case, the evaporator fans are on and the compressor, door heater and multiple duct fan switch units are all in a not applicable state. Here, the evaporator fans are used simply to circulate the inside air.

From the foregoing, it can be seen that this system provides refrigeration utilizing ambient air auxiliary systems, but it does so in such a matter as to eliminate most of the lost energy and added cost. The advantages of this system are that only the specific unit needed is used as required for optimum efficiency, because each unit is individually controlled.

While I have described my invention in connection with specific embodiments thereof, it is clearly to be understood that this is done only by way of example and not as a limitation to the scope of our invention as set forth in the objects thereof and in the appended claims.

I claim:

1. An integral ambient air and refrigerated energy saving system, for use by operations using walk in refrigerated enclosures and the like, comprising:
    main mechanical refrigeration means;
    said mechanical refrigeration means having evaporator means;
    said main mechanical refrigeration means comprising at least one evaporator fan means;
    said main mechanical refrigeration means further comprising compressor means;
    said main mechanical refrigeration means further comprising thermostatic control means for controlling said main mechanical refrigeration means;
    said main mechanical refrigeration means having door heating means;
    said door heating means comprising door heating control means for controlling said door heating means independently;
    ambient air cooling system means comprising at least one outside air injection fans;
    fan controller means for controlling each of said outside air injection fans independently;
    compressor control means for controlling said compressor means independently;
    freeze up protection means;
    said freeze up protection means comprising set up control for measuring an outside temperature freeze up point;
    said freeze up protection means further comprising set up control means for measuring an inside temperature freeze up point;
    system control means;

said system control means comprising means for measuring outdoor temperature, enclosure temperature and freeze up;

said system control means further comprising means for operating said evaporator fan controller means;

said evaporator fan control means having independent control over each of said fans;

said system control means further comprising means for operating said compressor controller means;

said system control means further comprising means for operating said ambient air cooling system means;

evaporator coil defrost means; and exhaust means.

2. An integral ambient air and refrigerated energy saving system, according to claim 1, wherein:

said evaporator coil defrost means comprises at least one fan means; and said evaporator coil defrost means has a defrosting clock control means.

3. An integral ambient air and refrigerated energy saving system, according to claim 1, wherein;

said exhaust means has damper means;

said damper means comprises passive means; and said damper means comprises active means.

* * * * *